J. PARKER.
Machine for Slaughtering Hogs.
No. 3,180.
Reissued Nov. 3, 1868.
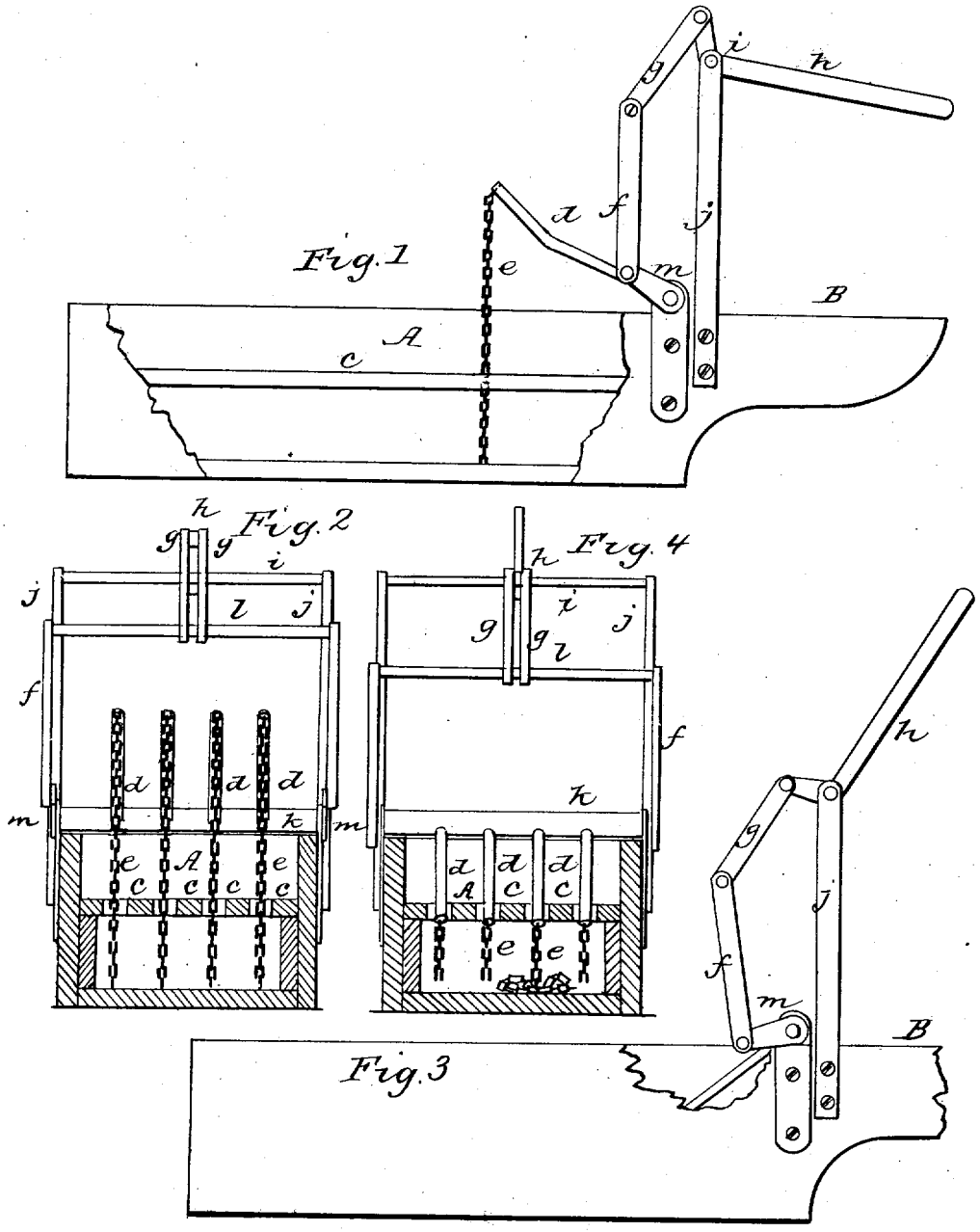
N. PETERS, Photo-Lithographer, Washington, D. C.

UNITED STATES PATENT OFFICE.

JEFFERSON PARKER, OF LOUISVILLE, KENTUCKY.

IMPROVEMENT IN MACHINE FOR SLAUGHTERING HOGS.

Specification forming part of Letters Patent No. 12,395, dated February 13, 1855; Reissue No. 3,180, dated November 3, 1868.

*To all whom it may concern:*

Be it known that I, JEFFERSON PARKER, of Louisville, in the county of Jefferson and State of Kentucky, have invented certain new and useful Improvements in Machines for Slaughtering Hogs; and I do hereby declare that the following is a full, clear, and exact description of the construction and operation of the same, reference being had to the annexed drawings, making part of this specification, in which—

A is the oblong scalding-vessel. C C are longitudinal bars secured within the said vessel for the hogs to rest upon while undergoing the scalding process. B is the scraping-table at one end of the scalding-vessel, to which the hogs are removed from the scalding-vessel for the purpose of cleaning them.

The hogs are removed from the scalding-vessel to the scraping-table in the following easy and convenient manner, viz: by means of the fingers *d d*, which project from the horizontal shaft K, that is placed at the inner end of the scraping-table B, and which has short arms *m* at the extremity of each of its journals, that are connected by means of the side levers *f f*, the horizontal shaft *l*, and the central levers *g g*, with the short end of the curved operating lever *h*, which works upon the fulcrum-shaft *i*, that is secured in the uprights J J, as shown in the drawings.

The said fingers are so arranged that, when they are let down into the position shown in Figs. 3 and 4, they will pass between the slots *c c* in the scalding-vessel; and they (the said fingers) are curved into such a shape that when they are thus depressed, and a hog is floated over them, the hog will be lifted upon said fingers as they are elevated, and as said fingers are carried upward into the position shown in Fig. 1 the hog elevated by them will glide off upon the scraping-table B.

The chains *e e*, which are connected to the ends of the fingers *d d*, and to the bottom of the scalding-vessel, must be of such a length that they will be straightened when the fingers are elevated to their highest position, as shown in Fig. 1, the object of which arrangement is to keep the hogs in the scalding-vessel from floating under the fingers when they are elevated, and preventing their return to the proper position for elevating another hog to the scraping-table.

What I claim as my invention, and desire to secure by Letters Patent, is—

The combination of the shaft K, elevating-fingers *d d*, scalding-vessel A, and scraping-bench B, for the purpose set forth.

JEFFERSON PARKER.

Witnesses:

ROBT. A. HAMILTON,
H. D. HAWES.